(12) United States Patent
Sun et al.

(10) Patent No.: US 10,785,797 B2
(45) Date of Patent: Sep. 22, 2020

(54) BEAM REFINEMENT REFERENCE SIGNAL (BRRS) DESIGN FOR MMWAVE SYSTEM IN SHARED SPECTRUM

(71) Applicant: QUALCOMM Incorporated, San Diego, CA (US)

(72) Inventors: Jing Sun, San Diego, CA (US); Tao Luo, San Diego, CA (US); Tamer Kadous, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 54 days.

(21) Appl. No.: 15/997,533

(22) Filed: Jun. 4, 2018

(65) Prior Publication Data

US 2019/0373640 A1  Dec. 5, 2019

(51) Int. Cl.
 *H04W 74/08* (2009.01)
 *H04L 5/00* (2006.01)
 *H04W 16/14* (2009.01)
 *H04W 72/12* (2009.01)
 *H04W 72/14* (2009.01)

(52) U.S. Cl.
 CPC ....... *H04W 74/0816* (2013.01); *H04L 5/0048* (2013.01); *H04W 16/14* (2013.01); *H04W 72/1268* (2013.01); *H04W 72/1273* (2013.01); *H04W 72/14* (2013.01)

(58) Field of Classification Search
 CPC ............. H04W 74/0816; H04W 16/14; H04W 72/1268; H04W 72/14; H04W 72/1273; H04L 5/0048
 See application file for complete search history.

(56) References Cited

U.S. PATENT DOCUMENTS

| 2017/0105224 A1* | 4/2017 | Ghanbarinejad ..... H04L 5/0055 |
| 2018/0103461 A1 | 4/2018 | Sun et al. |
| 2019/0007116 A1* | 1/2019 | Chang .................. H04B 7/0684 |
| 2019/0044584 A1* | 2/2019 | Lee ....................... H04B 7/0417 |
| 2019/0274165 A1* | 9/2019 | Pu ........................ H04B 17/318 |

FOREIGN PATENT DOCUMENTS

| WO | 2018053359 A1 | 3/2018 |
| WO | 2018085556 A2 | 5/2018 |

OTHER PUBLICATIONS

International Search Report and Written Opinion—PCT/US2019/034380—ISA/EPO—dated Jul. 31, 2019.

* cited by examiner

*Primary Examiner* — Shailendra Kumar

(74) *Attorney, Agent, or Firm* — Patterson + Sheridan, L.L.P.

(57) ABSTRACT

Certain aspects of the present disclosure provide techniques for beam refinement reference signal (BRRS) design for millimeter wave (mmWave) system in shared spectrum. The techniques can include a method for wireless communication that includes transmitting at least one of a request-to-send (RTS) or a clear-to-send (CTS) within a frame using frequency resources in a shared spectrum, and including a beam refinement reference signal (BRRS) in the at least one of the RTS or CTS.

13 Claims, 14 Drawing Sheets

BEAM REFINEMENT REFERENCE SIGNAL (BRRS) DESIGN FOR MMWAVE SYSTEM IN SHARED SPECTRUM

FIELD OF THE DISCLOSURE

Aspects of the present disclosure relate to wireless communications, and more particularly, to techniques for beam refinement reference signal (BRRS) design for millimeter wave (mmWave) system in shared spectrum.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication. The method generally includes transmitting at least one of a request-to-send (RTS) or a clear-to-send (CTS) within a frame using frequency resources in a shared spectrum, and including a beam refinement reference signal (BRRS) in the at least one of the RTS or CTS.

Certain aspects provide an apparatus for wireless communication. The apparatus includes means for transmitting at least one of a request-to-send (RTS) or a clear-to-send (CTS) within a frame using frequency resources in a shared spectrum, and means for including a beam refinement reference signal (BRRS) in the at least one of the RTS or CTS.

Certain aspects provide an apparatus for wireless communication. The apparatus includes at least one processor configured for transmitting at least one of a request-to-send (RTS) or a clear-to-send (CTS) within a frame using frequency resources in a shared spectrum, and including a beam refinement reference signal (BRRS) in the at least one of the RTS or CTS. The apparatus also includes a memory coupled to the at least one processor.

Certain aspects provide a non-transitory computer readable medium for wireless communication having instructions stored thereon. The instructions stored thereof are for transmitting at least one of a request-to-send (RTS) or a clear-to-send (CTS) within a frame using frequency resources in a shared spectrum, and including a beam refinement reference signal (BRRS) in the at least one of the RTS or CTS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
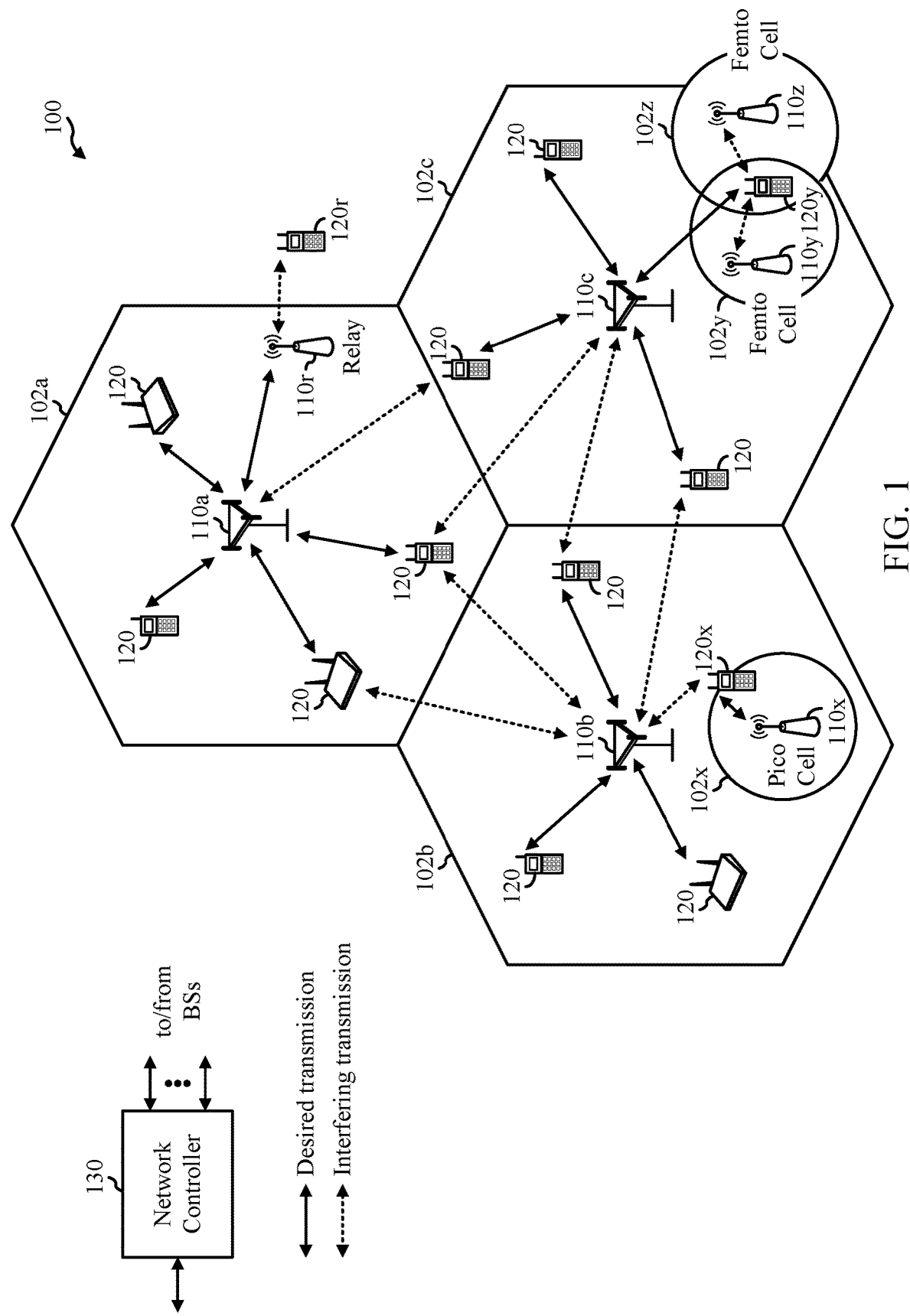
FIG. 1 is a block diagram conceptually illustrating an example telecommunications system, in accordance with certain aspects of the present disclosure.

Aspects of the present disclosure provide apparatus, methods, processing systems, and computer readable mediums for beam refinement reference signal (BRRS) design for millimeter wave (mmWave) system in shared spectrum.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
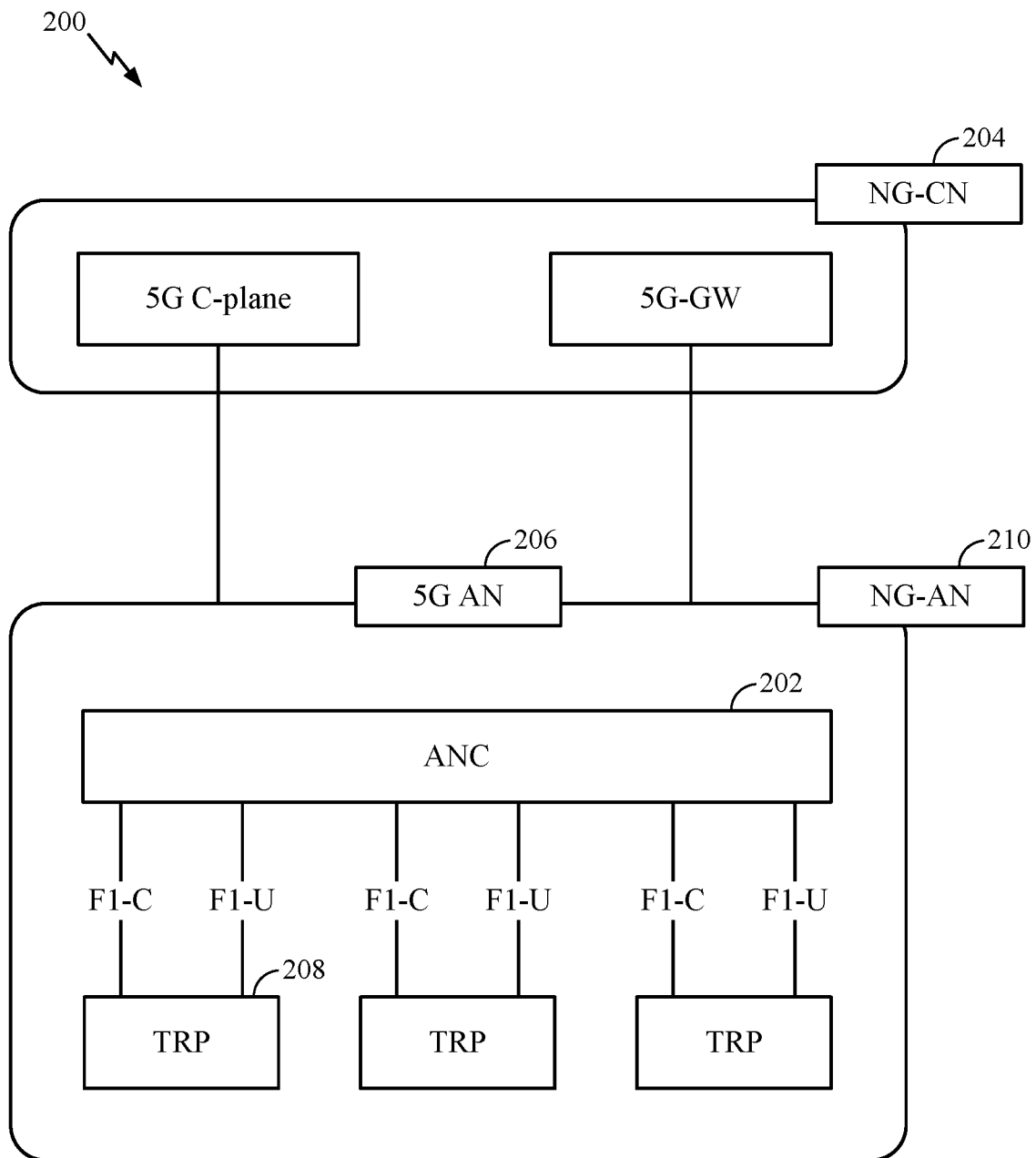
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
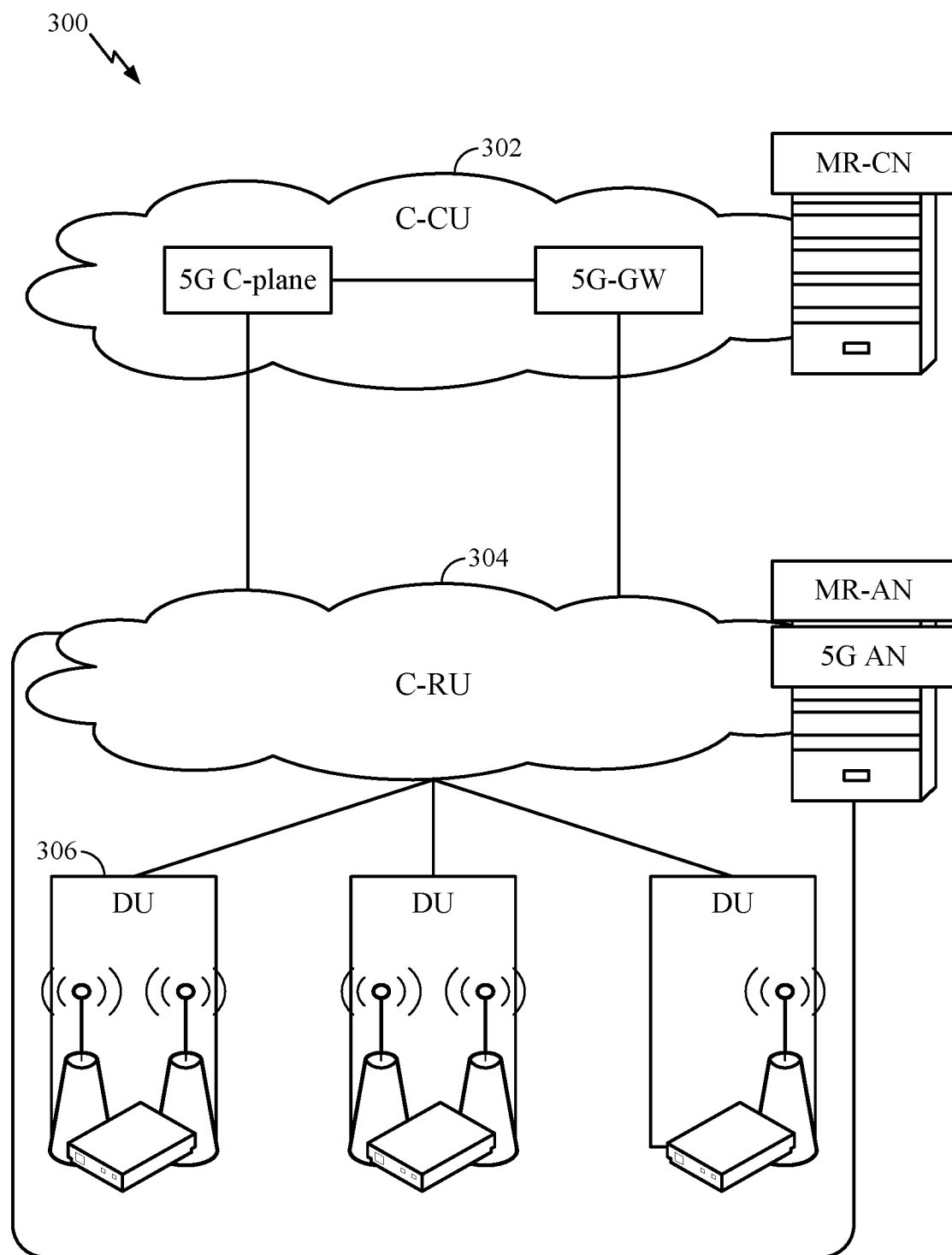
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
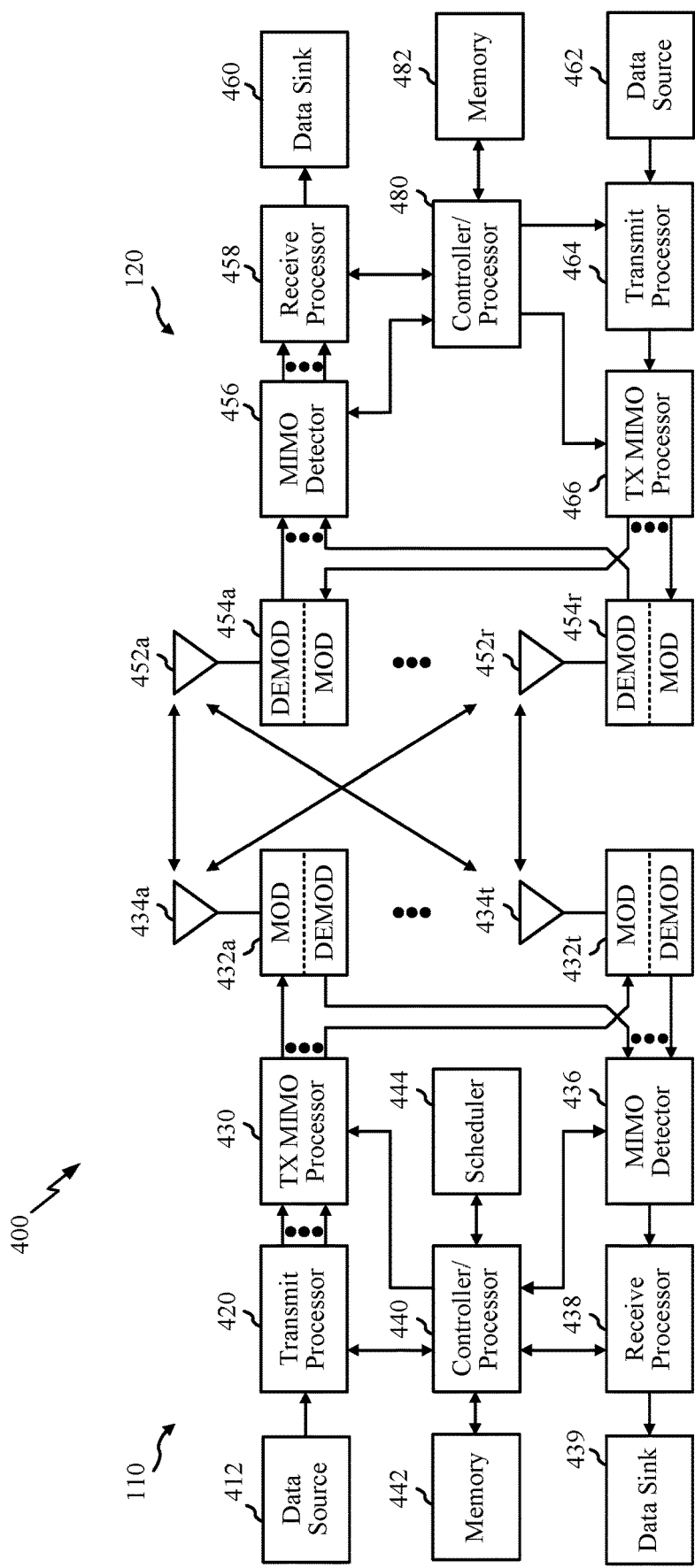
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein and illustrated with reference to FIG. 9.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
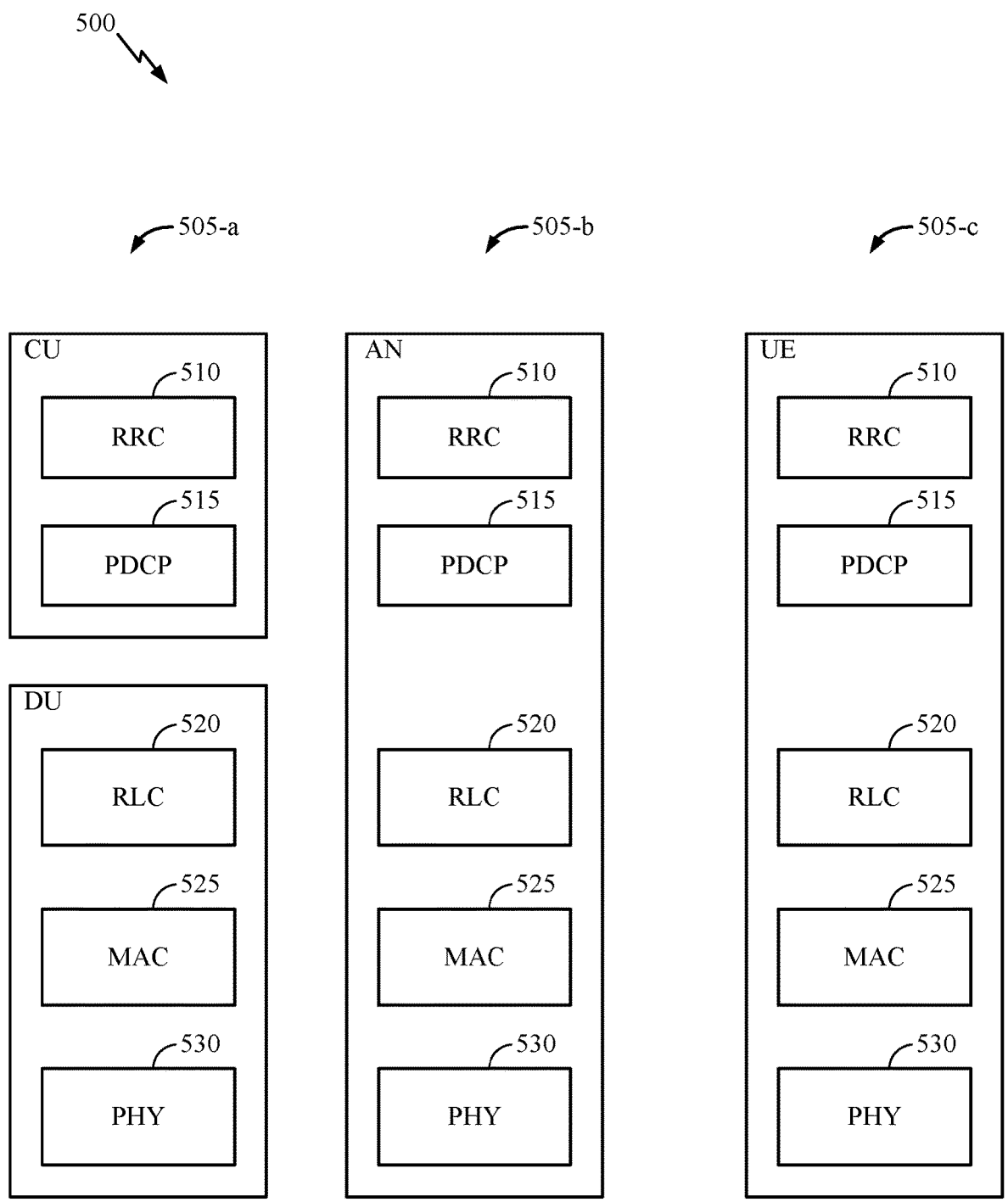
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
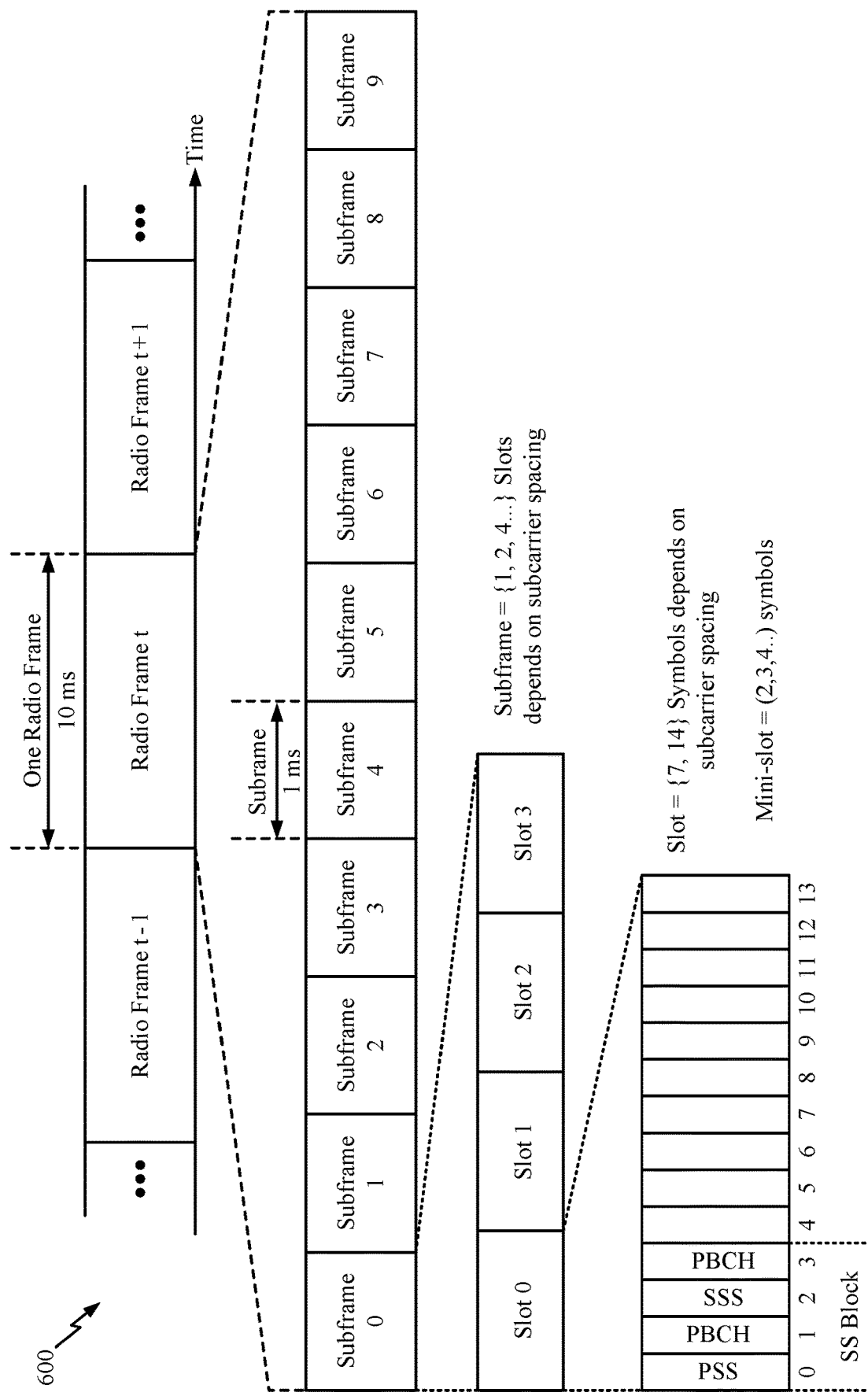
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example of Beam Refinement Reference Signal (BRRS) Design for mm Wave System in Shared Spectrum A general frame structure is provided in 5G NR Shared Spectrum (NR-SS) that allows for the use of a shared spectrum. For example, NR-SS in the sub-6 GHz range may provide a general listen-before-talk (LBT) frame structure. This LBT frame structure can include a request-to-send (RTS) transmission and a clear-to-send (CTS) transmission. In particular, the LBT frame structure can specifically include a pair of multiband-RTS/multiband-CTS (mRTS/mCTS) bursts in the beginning of the overall frame structure. Examples of such frame structures are show in FIGS. 7A and 7B.

Figure 7A:
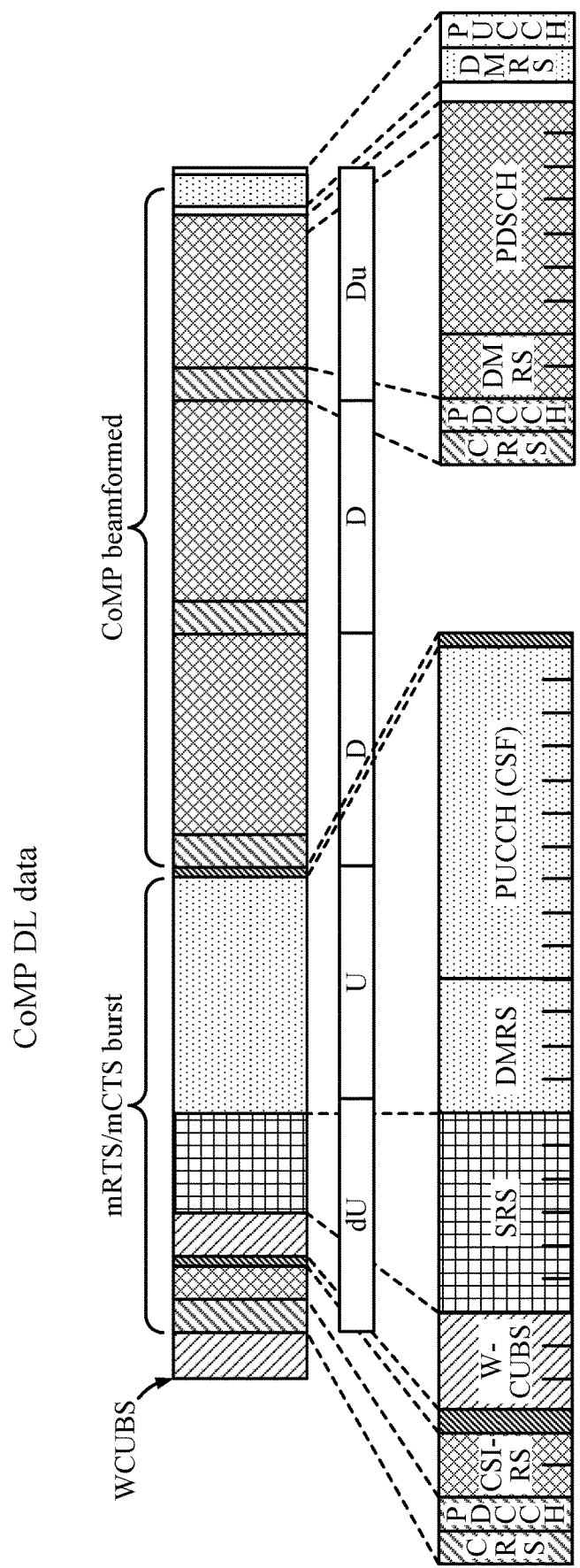
FIG. 7A illustrates an example of a frame structure that provides coordinated multipoint (CoMP) downlink (DL) data for a new radio (NR) system, in accordance with certain aspects of the present disclosure.
Figure 7B:
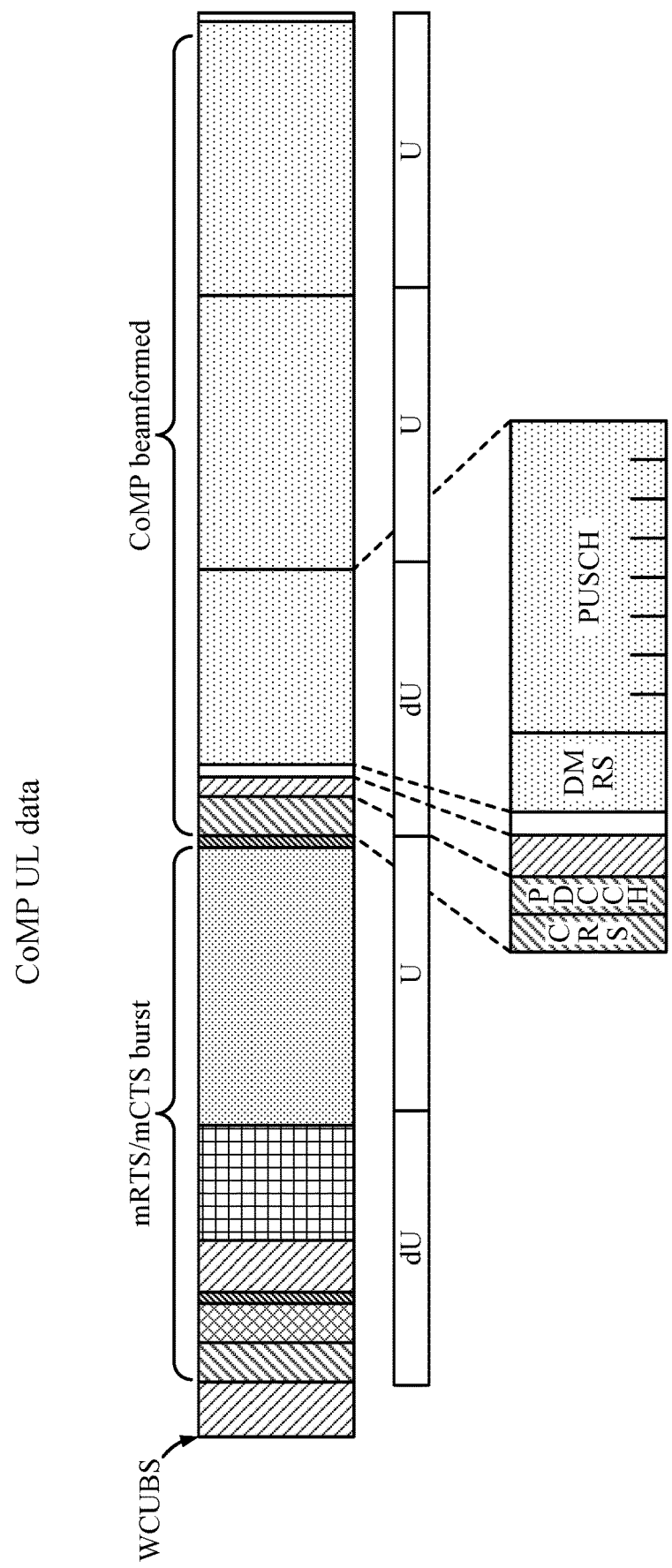
FIG. 7B illustrates an example of a frame structure that provides CoMP uplink (UL) data for a new radio (NR) system, in accordance with certain aspects of the present disclosure.

Specifically, FIG. 7A illustrates an example of a frame structure that provides coordinated multipoint (CoMP) downlink (DL) data for a new radio (NR) system, in accordance with certain aspects of the present disclosure. FIG. 7B illustrates an example of a frame structure that provides CoMP uplink (UL) data for a new radio (NR) system, in accordance with certain aspects of the present disclosure. As shown these cases each include a pair of mRTS/mCTS bursts in the beginning of the LBT frame. Further, the mRTS contains a CSI-RS. Additionally, the mCTS contains SRS. As shown, the mRTS/mCTS bursts are followed by data bursts. In some cases the DL data bursts are followed by the UL data bursts.

Figure 8:
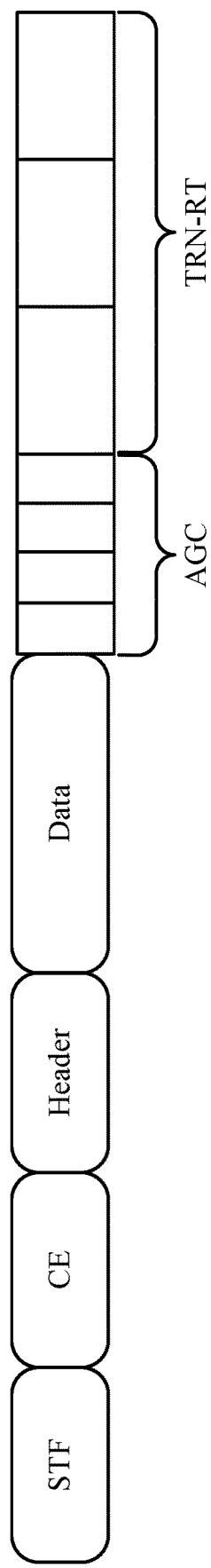
FIG. 8 illustrates an example of an 802.11ad frame design, in accordance with certain aspects of the present disclosure.

FIG. 8 illustrates an example of an 802.11ad frame design, in accordance with certain aspects of the present disclosure. As shown, the 802.11ad frame design includes a short training field (STF), a channel estimation (CE) field, a header, and data. Further, in some cases, the 802.11ad frame design, at the end of each data burst (data), may optionally include one or more training fields. In particular, the frame design may include an automatic gain control (AGC) training field and a transmitter/receiver training field (TRN-R/T) as shown after the data. These training fields may be used for beam refinement and beam tracking. In other cases, a beam refinement RS (BRRS) can be transmitted in the last two symbols of a downlink (DL) subframe, or in other cases the BRRS can cover the whole subframe. A grant triggered transmission may be provided based on the BRRS transmitted in either the last two symbols or in the whole subframe.

Figure 9:
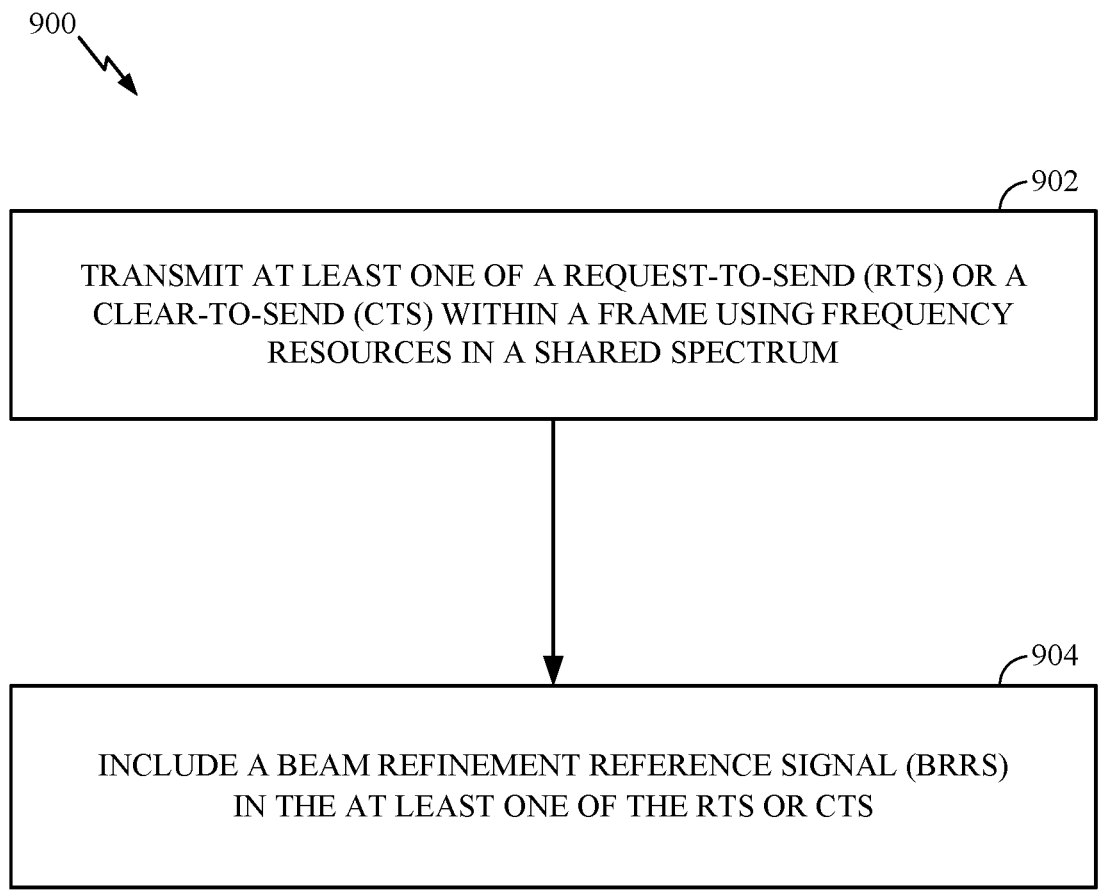
FIG. 9 illustrates example operations for wireless communications, in accordance with aspects of the present disclosure.

FIG. 9 illustrates example operations 900 for wireless communications, in accordance with aspects of the present disclosure. In one or more cases, the operations 900 for wireless communications may be performed by one or more of a network entity or a user equipment (UE).

Specifically, operations 900 begin, at block 902, with transmitting at least one of a request-to-send (RTS) or a clear-to-send (CTS) within a frame using frequency resources in a shared spectrum. Further, operations 900 further include, at block 904, including a beam refinement reference signal (BRRS) in the at least one of the RTS or CTS. In some cases, the BRRS is a downlink beam refinement reference signal (D-BRRS) when included in the RTS. In some cases, the BRRS is an uplink beam refinement reference signal (U-BRRS) when included in the CTS.

According to one or more cases, when a network entity performs the operations 900 the transmitting at block 902 comprises transmitting the RTS to one or more UEs. Further, the including at block 904 comprises including a downlink beam refinement reference signal (D-BRRS) in the RTS. In some cases, including the D-BRRS in the RTS comprises replacing a channel state information reference signal (CSI-RS) in the RTS with the D-BRRS. In some cases, the operations may further include receiving the CTS that includes an uplink beam refinement reference signal (U-BRRS) from at least one of the one or more UEs. The operations may further include transmitting a downlink (DL) grant and DL data based on the RTS and CTS. Further, the operations may include transmitting an uplink (UL) grant based on the RTS and CTS.

According to one or more cases, when a UE performs the operations 900, the operations may further include receiving the RTS that includes a downlink beam refinement reference signal (D-BRRS) from a network entity. Further, when a UE performs the operations 900 the transmitting at block 902 comprises transmitting the CTS to the network entity, and the including at block 904 comprises including an uplink beam refinement reference signal (U-BRRS) in the CTS. In some cases, including the U-BRRS in the CTS comprises replacing a sounding reference signal (SRS) in the CTS with the U-BRRS. In some cases, the operations may further include receiving an uplink (UL) grant based on the RTS and CTS from the network entity, and transmitting UL data based on the UL grant.

A number of different factors and scenarios may be provided and considered when determining a design for a shared spectrum frame. For example, a shared spectrum transmission may be subjected to listen-before-talk (LBT) and may not be periodic. For example, in one or more cases, it is possible that there is long segment of silence followed by a data burst. Accordingly, providing training fields at the end after a data burst, as done in the 802.11ad design show in FIG. 8, may not provide accurate or up to date information in a case where during the long segment of silence conditions have changed such as, for example, movement of devices or other communications beginning or ending.

Further, a design that puts a BRRS at the end of a subframe assumes there is a continuous stream of subframes thereby allowing for the trained beam to be used in the next/future subframe. However, for a system that is not periodic, such as for example a system that is not licensed and can therefore not be expected to provide periodic transmission, this continuous assumption is not provided. Therefore, training in one data subframe and then using the training output in the next subframe may not work due to a non-periodic structure of transmission making the training potentially outdated and invalid.

Figure 10A:
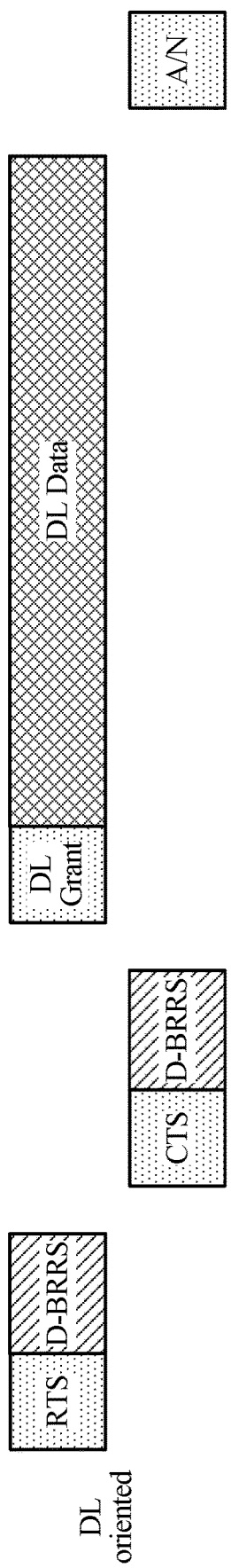
FIG. 10A illustrates an example of a frame structure that provides DL data for a new radio (NR) system, in accordance with certain aspects of the present disclosure.
Figure 10B:
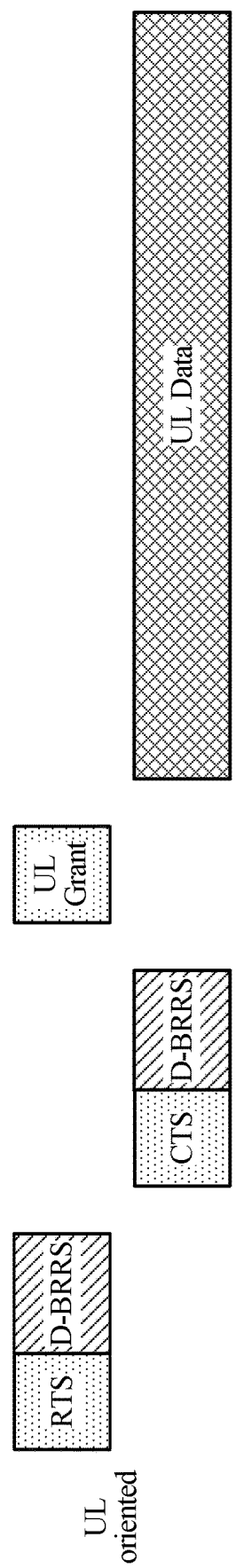
FIG. 10B illustrates an example of a frame structure that provides UL data for a new radio (NR) system, in accordance with certain aspects of the present disclosure.

FIG. 10A illustrates an example of a frame structure that provides DL data for a new radio (NR) system, in accordance with certain aspects of the present disclosure. FIG. 10B illustrates an example of a frame structure that provides UL data for a new radio (NR) system, in accordance with certain aspects of the present disclosure. As shown, one design for shared spectrum includes putting the BRRS in the RTS/CTS. Currently in the sub-6 GHz design, there may be provided a CSI-RS in RTS and SRS in CTS. In one or more cases, the CSI-RS and the SRS are replaced with D-BRRS and U-BRRS, respectively, as shown in FIGS. 10A and 10B. In some cases, the D-BRRS/U-BRRS double as CSI-RS/SRS for channel estimation as well when the right beam is used. In one or more cases, receiver based beam refinement can be used to reduce/avoid beam index feedback.

In one or more cases, at least two types of BRRS may be provided. For example, a transmitter refinement BRRS may be provided. In other cases, for example, a receiver refinement BRRS may be provided.

The transmitter refinement BRRS may be provided which may include transmitter side beam refinement with receiver assistance. For example, a transmitter may transmit different beams in different BRRS resources typically using, for example, time-division multiplexing (TDM). A receiver may use the same beam to receive all transmitted beams, and may then pick the best one for the receiver. The receiver may then report which beam is the preferred beam to the transmitter. The transmitter may then use that reported beam for future transmissions, and in some cases receptions.

Another type of BRRS that may be provided in the receiver refinement BRRS. The receiver refinement BRRS may include receiver side beam refinement with transmitter assistance. For example, a transmitter may transmit the same beam over multiple BRRS resources (for example, multiple OFDM symbols). A receiver may then try different beams to match with the transmitted beam, and pick the best receive beam. The receiver may then use the selected beam for future reception, and in some cases also for transmission. In one or more cases, there is no need to feedback this information to the transmitter, because in some cases the transmitter does not need to know.

In either approach, a selection of beams around the original beam may be sensed using a tracking mode. When comparing the two approaches, the receiver refinement may fit some needs better in certain scenarios with certain conditions and elements present such as, for example in aperiodic, non-licensed, and/or shared spectrum embodiments. In such use cases, a better timeline may be provided that may have no feedback needed. Further, the D-BRRS and U-BRRS may double as CSI-RS and SRS, respectively.

Figure 11:
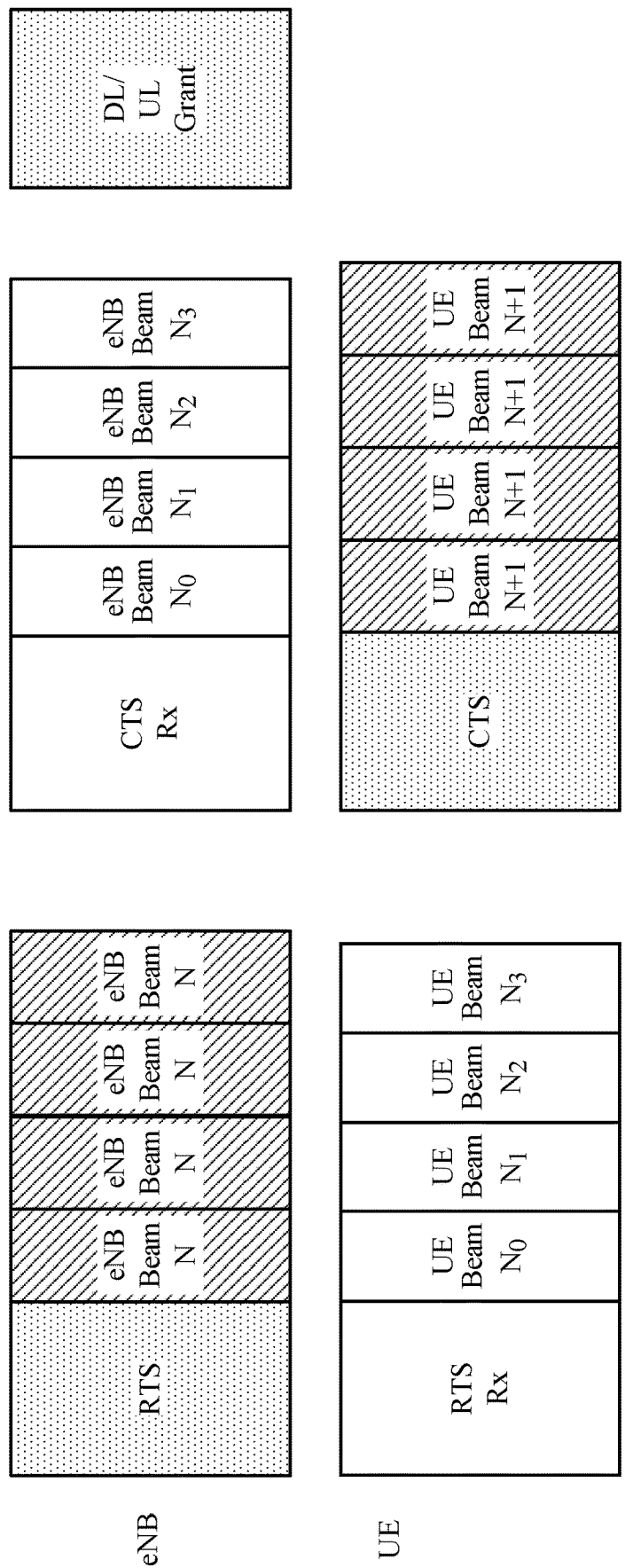
FIG. 11 illustrates a detailed procedure of a UE and eNB transmitting and receiving RTS and CTS with BRRS, in accordance with certain aspects of the present disclosure.

FIG. 11 illustrates a detailed procedure of a UE and eNB transmitting and receiving RTS and CTS with BRRS, in accordance with certain aspects of the present disclosure. In particular, beam sweeping may be provided in the RTS/CTS as shown. In one or more cases, the RTS may contain a pre-grant that indicates which UE is to be served. The RTS may be beamformed as well using the latest eNB side beam N. In some cases the beam is UE specific. The UE can then detect the RTS using the latest UE side beam N. Further, the eNB transmits BRRS multiple times with the latest UE beam (eNB side beam N). The UE then detects the BRRS using different beams around the latest UE side beam, specifically, Beam $N_0$, $N_1$, . . . , all around beam N. In one or more cases, the beam may be the UE side beam N, in case the beam does not change. In some cases, for timing purposes, procedures may include having $N_0$ beam equals the beam N which may leave some time for RTS decoding delay. In some cases, after the above procedures, the next operation may include trying all beams and picking the best beam as the new latest beam N+1.

In some cases, a UE can then transmit CTS and multiple BRRS using beam N+1. An eNB can then use the lasted eNB side beam N to detect the CTS. The eNB can then detect the BRRS using different beams around the latest UE side beam, such as beam $N_0$, $N_1$, . . . , all around beam N. In one or more cases, the beam can be the UE side beam N, in case the beam does not change. In some cases, for timing purposes, having $N_0$ beam equals beam N may leave some time for RTS decoding delay. In some cases, after the above procedures, the next operation may include trying all beams and picking the best beam as the new latest eNB side beam N+1. Finally, the eNB may transmit the data grant using latest eNB side beam N+1.

In some cases, transmissions may be provided for keeping communications open without any data being exchanged. These transmissions may be called a keep-alive set of transmissions. A keep-alive case may be used for a connected mode, where no active traffic is provided. For example, a RTS/CTS only transaction can be used to keep the beam tracking loop alive. Specifically, an RTS is followed by CTS, but there is no data transmission that follows. These transmissions will contain D-BRRS and U-BRRS, and may be distinguished from a normal transmission either using special PFFICH or an added flag in a pre-grant. In some cases, a PFFICH might be used so that other nodes that overheard the burst can respond accordingly.

Figure 12:
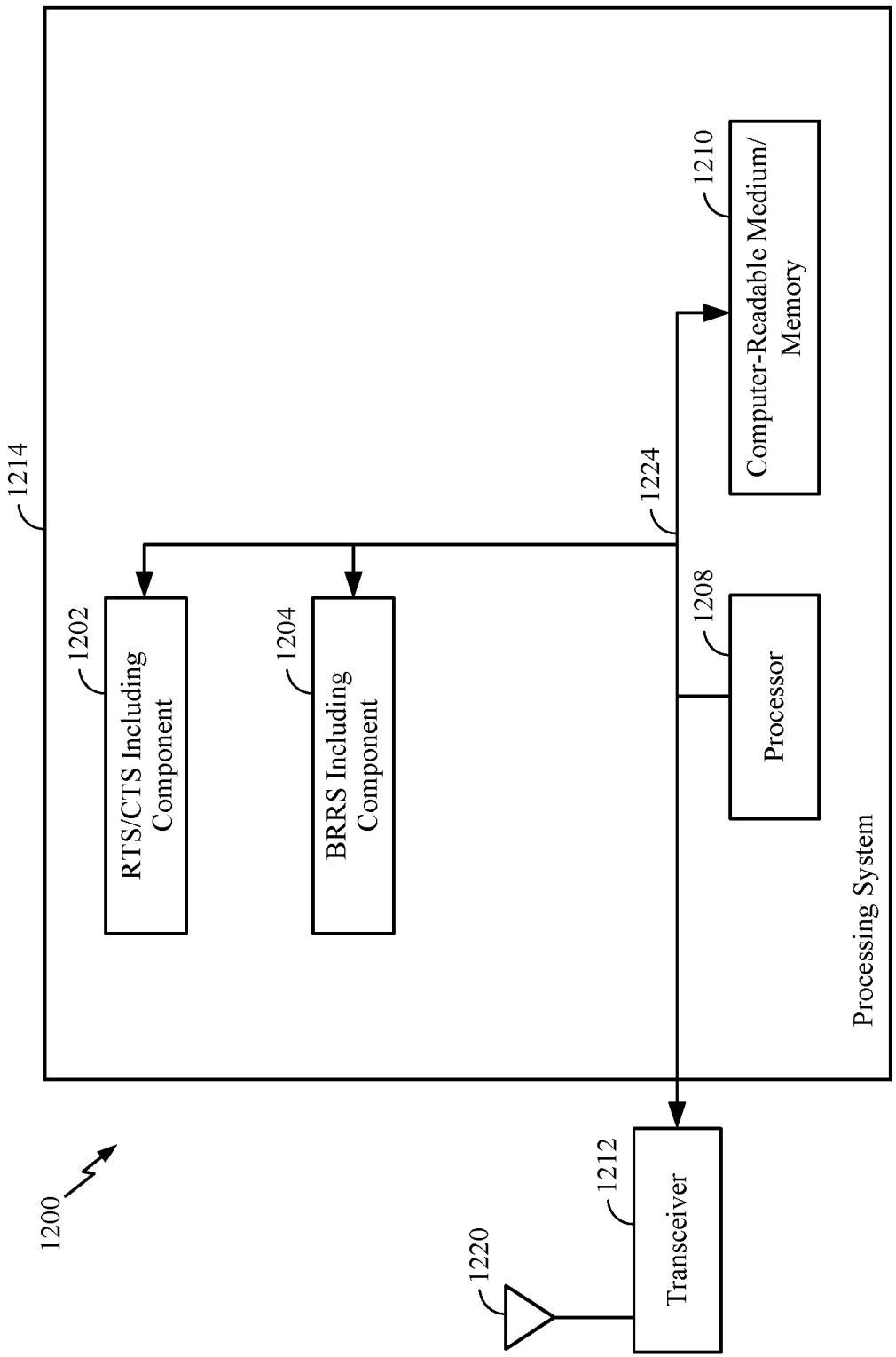
FIG. 12 illustrates a communications device that may include various components configured to perform operations for the techniques disclosed herein in accordance with aspects of the present disclosure.

FIG. 12 illustrates a communications device that may include various components configured to perform operations for the techniques disclosed herein in accordance with aspects of the present disclosure. In particular, FIG. 12 illustrates a communications device 1200 that may include various components (e.g., corresponding to means-plus-function components) configured to perform operations for the techniques described herein, such as the operations 900 illustrated in FIG. 9. The communications device 1200 includes a processing system 1214 coupled to a transceiver 1212. The transceiver 1212 is configured to transmit and receive signals for the communications device 1200 via an antenna 1220, such as the various signal described herein. The processing system 1214 may be configured to perform processing functions for the communications device 1200, including processing signals received and/or to be transmitted by the communications device 1200.

The processing system 1214 includes a processor 1208 coupled to a computer-readable medium/memory 1210 via a bus 1224. In certain aspects, the computer-readable medium/memory 1210 is configured to store instructions that when executed by processor 1208, cause the processor 1208 to perform the operations illustrated in FIG. 9, or other operations for performing the various techniques discussed herein. In certain aspects, the processing system 1214 further includes a RTS/CTS including component 1202 for performing the operations illustrated at 902 in FIG. 9. The processing system 1214 also includes a BRRS including component 1204 for performing the operations illustrated at 904 in FIG. 9.

The RTS/CTS including component 1202 and BRRS including component 1204 may be coupled to the processor 1208 via bus 1224. In certain aspects, the RTS/CTS including component 1202 and BRRS including component 1204 may be hardware circuits. In certain aspects, the RTS/CTS including component 1202 and BRRS including component 1204 may be software components that are executed and run on processor 1208.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

Figure 9A:
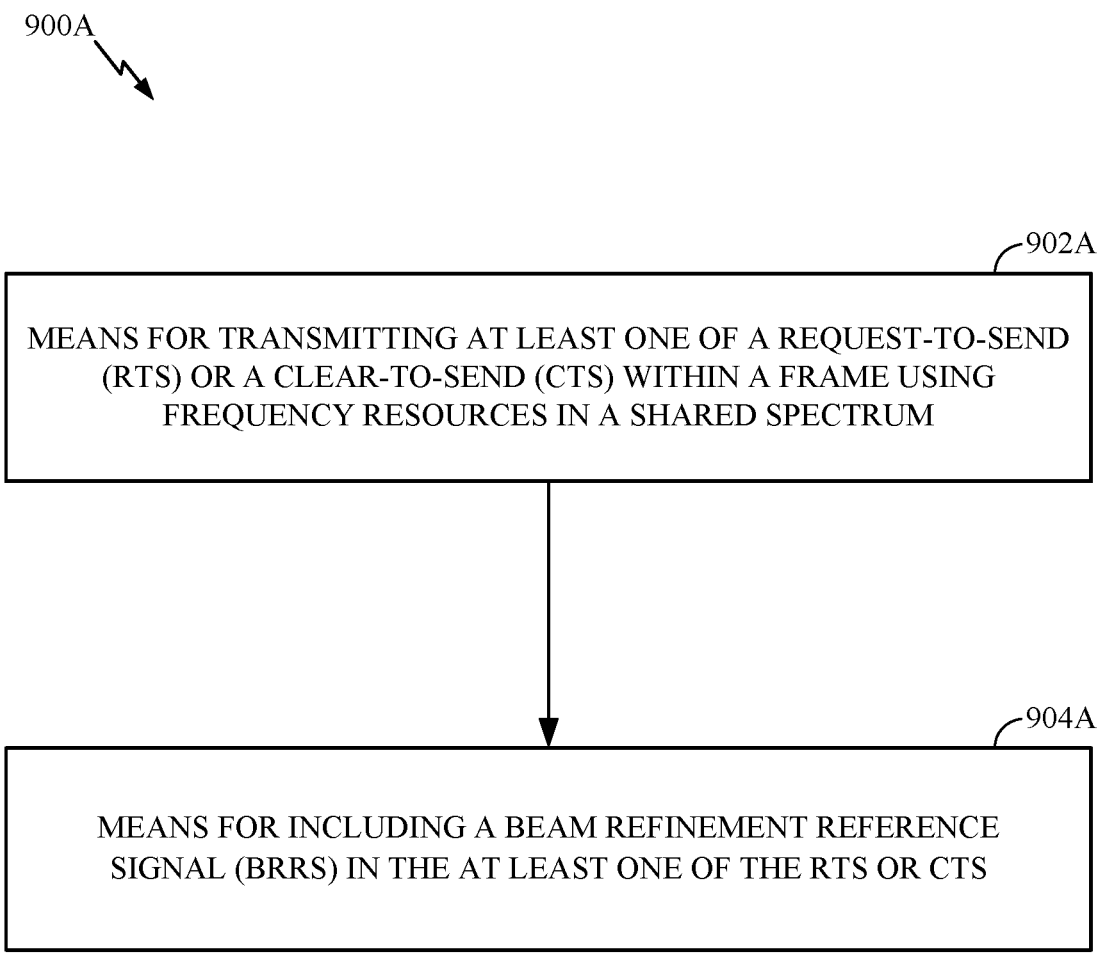
FIG. 9A illustrates example components capable of performing the operations shown in FIG. 9.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 900 illustrated in FIG. 9 correspond to means 900A illustrated in FIG. 9A.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for including, and/or means for replacing may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method performed by a communications device for wireless communication, comprising:
   transmitting at least one of a request-to-send (RTS) or a clear-to-send (CTS) within a frame using frequency resources in a shared spectrum; and
   including a beam refinement reference signal (BRRS) in the at least one of the RTS or the CTS, wherein including the BRRS comprises:
      replacing a channel state information reference signal (CSI-RS) in the RTS with a downlink BRRS (D-BRRS); or
      replacing a sounding reference signal (SRS) in the CTS with an uplink BRRS (U-BRRS).

2. The method of claim 1, wherein:
   the communications device comprises a network entity;
   transmitting the at least one of the RTS or the CTS comprises transmitting the RTS to one or more UEs; and
   including the BRRS in the at least one of the RTS or the CTS comprises including the D-BRRS in the RTS.

3. The method of claim 2, further comprising receiving the CTS that includes the U-BRRS from at least one of the one or more UEs.

4. The method of claim 3, further comprising transmitting a downlink (DL) grant and DL data based on at least one of the RTS or the CTS.

5. The method of claim 3, further comprising transmitting an uplink (UL) grant based on at least one of the RTS or the CTS.

6. The method of claim 1, wherein:
   the communications device comprises a user equipment (UE); and the method further comprises:
  receiving the RTS that includes the D-BRRS from a network entity;
  transmitting the at least one of the RTS or the CTS comprises transmitting the CTS to the network entity; and
  including the BRRS in the at least one of the RTS or the CTS comprises including the U-BRRS in the CTS.

7. The method of claim 6, further comprising:
receiving an uplink (UL) grant from the network entity based on at least one of the RTS or the CTS; and
transmitting UL data based on the UL grant.

8. An apparatus for wireless communication, comprising:
means for transmitting at least one of a request-to-send (RTS) or a clear-to-send (CTS) within a frame using frequency resources in a shared spectrum; and
means for including a beam refinement reference signal (BRRS) in the at least one of the RTS or the CTS, wherein the means for including the BRRS comprises:
  means for replacing a channel state information reference signal (CSI-RS) in the RTS with a downlink BRRS (D-BRRS); or
  means for replacing a sounding reference signal (SRS) in the CTS with an uplink BRRS (U-BRRS).

9. The apparatus of claim 8, wherein:
the apparatus comprises a network entity;
the means for transmitting the at least one of the RTS or the CTS comprises means for transmitting the RTS to one or more UEs; and
the means for including the BRRS in the at least one of the RTS or the CTS comprises means for including the D-BRRS in the RTS.

10. The apparatus of claim 9, further comprising:
means for receiving the CTS that includes the U-BRRS from at least one of the one or more UEs; and
at least one of:
  means for transmitting a downlink (DL) grant and DL data based on at least one of the RTS or the CTS; or
  means for transmitting an uplink (UL) grant based on at least one of the RTS or the CTS.

11. The apparatus of claim 8, wherein:
the apparatus comprises a user equipment (UE); and
the apparatus further comprises:
  means for receiving the RTS that includes the D-BRRS from a network entity;
  the means for transmitting the at least one of the RTS or the CTS comprises means for transmitting the CTS to the network entity; and
  the means for including the BRRS in the at least one of the RTS or the CTS comprises means for including the U-BRRS in the CTS.

12. The apparatus of claim 11, further comprising:
means for receiving an uplink (UL) grant from the network entity based on at least one of the RTS or the CTS; and
means for transmitting UL data based on the UL grant.

13. An apparatus for wireless communication, comprising:
at least one processor configured to:
  transmit at least one of a request-to-send (RTS) or a clear-to-send (CTS) within a frame using frequency resources in a shared spectrum; and
  include a beam refinement reference signal (BRRS) in the at least one of the RTS or the CTS, wherein including the BRRS comprises:
    replacing a channel state information reference signal (CSI-RS) in the RTS with a downlink BRRS (D-BRRS); or
    replacing a sounding reference signal (SRS) in the CTS with an uplink BRRS (U-BRRS); and
a memory coupled with the at least one processor.

* * * * *